(12) United States Patent
Zhu

(10) Patent No.: US 12,041,930 B2
(45) Date of Patent: Jul. 23, 2024

(54) SLOW-RELEASE SILK THREAD AND METHOD FOR PREPARING THE SAME

(71) Applicants: SOUTH BAY INTERNATIONAL, INC., Fontana, CA (US); Aldo New-Tech Materials (Jiaxing) Co., Ltd., Zhejiang (CN)

(72) Inventor: Jiajun Zhu, Zhejiang (CN)

(73) Assignees: SOUTH BAY INTERNATIONAL, INC., Fontana, CA (US); Aldo New-Tech Materials (Jiaxing) Co., Ltd., Jiaxing (CN)

(*) Notice: Subject to any disclaimer, the term of this patent is extended or adjusted under 35 U.S.C. 154(b) by 471 days.

(21) Appl. No.: 17/123,090

(22) Filed: Dec. 15, 2020

(65) Prior Publication Data

US 2022/0046911 A1     Feb. 17, 2022

(30) Foreign Application Priority Data

Aug. 17, 2020  (CN) .......................... 202010825497.6

(51) Int. Cl.
| A01N 25/10 | (2006.01) |
| A01N 37/22 | (2006.01) |
| A01N 65/12 | (2009.01) |
| A01N 65/28 | (2009.01) |
| A01N 65/36 | (2009.01) |
| A01N 65/44 | (2009.01) |

(52) U.S. Cl.
CPC ............. *A01N 25/10* (2013.01); *A01N 37/22* (2013.01); *A01N 65/12* (2013.01); *A01N 65/28* (2013.01); *A01N 65/36* (2013.01); *A01N 65/44* (2013.01)

(58) Field of Classification Search
None
See application file for complete search history.

(56) References Cited

FOREIGN PATENT DOCUMENTS

| CN | 102011261 A | * | 4/2011 | |
| CN | 103230180 A | * | 8/2013 | |
| CN | 204154929 U |   | 2/2015 | |
| CN | 104949972 A |   | 9/2015 | |
| CN | 105926278 A |   | 9/2016 | |
| CN | 106218149 A | * | 12/2016 | |
| CN | 108839405 A | * | 11/2018 | ............. B32B 27/06 |

* cited by examiner

*Primary Examiner* — Alton N Pryor

(57) ABSTRACT

A slow-release silk thread and a method for preparing the slow-release silk thread are provided. The slow-release silk thread includes a substrate layer, a slow-release layer, and a protective layer. The slow-release layer is provided between the substrate layer and the protective layer. The slow-release layer includes porous microspheric particles in which a functional agent is adsorbed. The slow-release silk thread obtains a composite structure through the method and realizes slow release of the functional agent by taking advantage of an adsorption performance of a special granular powder, thereby prolonging effective duration of the functional agent.

8 Claims, 1 Drawing Sheet

SLOW-RELEASE SILK THREAD AND METHOD FOR PREPARING THE SAME

CROSS-REFERENCE TO RELATED APPLICATIONS

This application claims the benefit of Chinese Patent Application No. 202010825497.6, filed on Aug. 17, 2020, the contents of which are incorporated herein by reference in their entireties.

FIELD OF THE INVENTION

The present disclosure relates to the technical field of materials, in particular to a slow-release silk thread and a method for preparing the slow-release silk thread.

BACKGROUND OF THE INVENTION

There are many species of mites in the world that are closely related to human health. For example, acaroid mites, dust mites, gamasida, chigger, and itch mites can bite people for blood, harm skin, and cause "rosacea" or demodicosis, urinary tract acariasis, lung acariasis, intestinal acariasis, allergies, eczema, asthma, rhinitis, scabies, etc., seriously endangering human health. What is more serious is that mites have super reproductive capability. There can be more than 10 million new mites on a winter mattress.

In order to decrease the harm of mites to people, several methods are typically used for repelling mites.

The first method is to expose sofa cushions, carpets, mattresses, and clothing that are prone to mites to the sunlight, but scientific experiments have shown that even if these are exposed to the sunlight for 6 hours, only 3.8% of mites can be eliminated.

The second method is to use a high-temperature steam spray to repel and kill mites. This method seems effective in repelling and killing mites, but in fact mites can quickly grow again and the number thereof can reach the level before the use of the steam spray.

The third method for repelling mites is to make a mite repelling agent or a mite repellent into agent bags, and put the mite repelling agent bags on sofas, carpets, mattresses, wardrobes, etc. However, due to volatilization of effective molecules in such mite repelling agent bags, efficacy of the agent bags could quickly become weak, resulting in reduced mite repelling effects and shortened duration of the mite repelling effects. Besides, when being scattered somewhere, the agent bags could be easily misused and eaten by children, which is very unsafe.

The fourth commonly used method for repelling mites is to spray a mite repelling agent or a mite repellent on surfaces of fibers or fabrics, or to soak fibers or fabrics in a mite repelling agent or a mite repellent to obtain textile products having a mite-repelling and mite-killing effect. However, the mite repelling agent or the mite repellent only adheres to the surfaces of the fibers or fabrics and can come into contact with people's skin. Further, the mite repelling agent or the mite repellent is not washable as it will be washed away from the surfaces of the fibers or the fabrics when the fibers or the fabrics are washed. This will reduce the mite repelling effect of the product or lead to loss of the mite repelling effect of the product.

In addition, there are other insects such as mosquitoes and flies that also bring many bacteria.

SUMMARY OF THE INVENTION

The present disclosure provides a slow-release silk thread to solve the technical problem about how to realize slow release of functional molecules.

Directed against the above technical problem, the present disclosure provides a slow-release silk thread. The slow-release silk thread includes a substrate layer, a slow-release layer, and a protective layer. The slow-release layer is provided between the substrate layer and the protective layer. The slow-release layer includes porous microspheric particles in which a functional agent is adsorbed.

Further, the porous microspheric particles are spherical porous silica powder or spherical porous carbon powder.

Further, the functional agent includes high-activity mite eliminating and bactericidal functional molecules and/or a natural herb extract.

Further, the high-activity mite eliminating and bactericidal functional molecules include N-(2-aminoethyl)-2-methylbenzamide with the following Chemical structure:

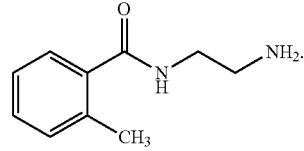

Further, the natural herb extract comprises a citronella essence and/or a lemon eucalyptus essence.

Further, the natural herb extract further comprises a wormwood essence.

Further, the substrate layer includes polyethylene terephthalate or polyurethane.

Further, the protective layer comprises polyurethane or polyethylene.

Further, the citronella essence or the lemon eucalyptus essence is 1-2 times by mass of the wormwood essence.

Further, the slow-release layer has a thickness of 5-15 microns.

Further, the porous microspheric particles each have a particle size of 1-5 microns, and the porous microspheric particles have an average particle size of 3 microns; and micropores of the porous microspheric particles each have a pore diameter of 2-50 nanometers, and the micropores of the porous microspheric particles have an average pore diameter of 10-15 nanometers.

Further, the substrate layer has a thickness of 10-16 microns.

Further, the protective layer has a thickness of 5-15 microns.

The slow-release silk thread provided by the present disclosure realizes slow release of the functional agent through a composite structure and by taking advantage of an adsorption performance of a special granular powder, thereby prolonging the effective duration of the functional agent.

The present disclosure further provides a method for preparing a slow-release silk thread. The method includes: applying, by a coating technique, a functional coating material to a polymer film to form a slow-release layer, the functional coating material including a functional agent, porous microspheric particles, and an organic solvent; applying, by a coating technique or a laminating technique, a polymer material to the slow-release layer to form a protective layer; and performing cutting along a direction from the protective layer to the polymer film to obtain silk threads.

Further, the porous microspheric particles are spherical porous silica powder or spherical porous carbon powder.

Further, the functional agent includes high-activity mite eliminating and bactericidal functional molecules and/or a natural herb extract.

Further, the high-activity mite eliminating and bactericidal functional molecules include N-(2-aminoethyl)-2-methylbenzamide with the following chemical structure:

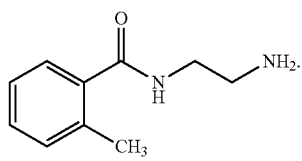

Further, the natural herb extract includes a citronella essence and/or a lemon eucalyptus essence.

Further, the natural herb extract further includes a wormwood essence.

Further, the polymer film is made of polyethylene terephthalate or polyurethane.

Further, the protective layer is made of polyurethane or polyethylene.

Further, the functional agent is prepared by mixing 400 parts by weight of the organic solvent as a base, with 5-40 parts by weight of the high-activity mite eliminating and bactericidal functional molecules, 1-10 parts by weight of the natural herb extract, and 50-85 parts by weight of the porous microspheric particles.

Further, the slow-release layer has a thickness of 5-15 microns.

The method for preparing the slow-release silk thread provided by the present disclosure realizes slow release of the functional agent by means of a composite process and by taking advantage of the adsorption performance of a special granular powder, thereby prolonging the effective duration of the functional agent.

BRIEF DESCRIPTION OF THE DRAWINGS

Other features, objectives and advantages of the present disclosure will become more evident by reading a detailed description of non-limiting embodiments with reference to the following drawings.

DESCRIPTION OF REFERENCE SIGNS

1—substrate layer; 2—slow-release layer; 3—protective layer.

DETAILED DESCRIPTION OF THE EMBODIMENTS

The present disclosure will be described in further detail below in conjunction with the accompanying drawings.

Figure 1:
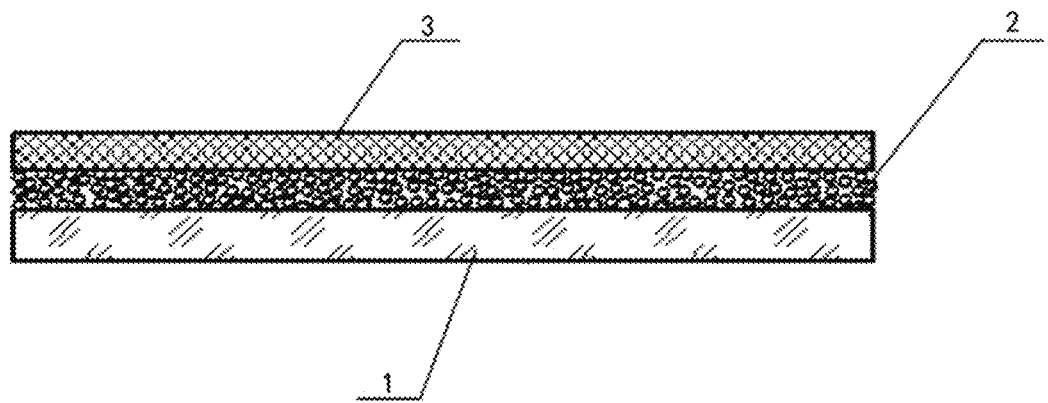
FIG. 1 is a schematic diagram showing a cross-sectional structure of a slow-release silk thread according to an embodiment of the present disclosure.

FIG. 1 is a schematic diagram showing a cross-sectional structure of a slow-release silk thread according to an embodiment of the present disclosure. As shown in FIG. 1, the slow-release silk thread provided by the present disclosure includes: a substrate layer 1, a slow-release layer 2, and a protective layer 3. The slow-release layer 2 is provided between the substrate layer 1 and the protective layer 3. The slow-release layer 2 includes porous microspheric particles in which a functional agent is adsorbed.

The slow-release silk thread of the present disclosure has an overall structure that is divided into three layers, namely the substrate layer 1, the slow-release layer 2, and the protective layer 3. The substrate layer 1 and the protective layer 3 are configured to support and protect the slow-release layer 2. The porous microspheric particles in the slow-release layer 2 are configured to absorb an agent having different effects, such as an agent having an insect eliminating, refreshing, or scenting effect. The functional agent usually has certain volatility. The slow-release silk thread can be used as a textile material in all kinds of textiles, especially mattresses, pillows and other products that directly contact human bodies. The functional agent is adsorbed by and then slowly released from micropores in surfaces of the porous microspheric particles and gaps between the microspheric particles, by way of which effective duration of the functional agent can be prolonged, and a long-lasting effect of the agent is thus ensured.

The substrate layer 1 and the protective layer 3 are preferably made of a material having good airtightness, such as a polymer film, to limit a contact area between the slow-release layer 2 and air, so as to control the release of the functional agent in the slow-release layer 2. The functional agent includes at least one functional ingredient. Functional molecules of the agent are adsorbed by micron-sized particles having nano-scale micropores inherent to the porous microspheric particles. Specific sizes can be adjusted depending on products of different sizes. The porous microspheric particles containing the functional agent are mixed with absolute ethanol to form a functional coating material. The functional coating material is then uniformly applied by a coating technique to the substrate layer 1 to form a powder layer, which is the slow-release layer 2. After that, a polymer material is applied by a laminating technique or a coating technique to the slow-release layer 2 to form a polymer film, which is the protective layer 3. A resulted product from the preparation is then subjected to a cutting procedure to obtain a silk thread. The obtained thread can be used in various textiles, such as fabrics for pillows, mattresses, and carpets. In this way, effective duration of the functional agent in the product is extended by prolonging the effect of the functional agent to achieve different long-lasting effects such as insect eliminating, refreshing, or scenting effects. A slow-release performance of a household product containing the slow-release silk thread is related to an amount and density of the slow-release silk thread used in a textile material of the household product, and can be adjusted depending on different needs. The functional agent adsorbed in the slow-release layer 2 can be released slowly only from cuts on both sides of the silk thread, which prolongs the effective duration of the functional agent and realizes slow release of the functional agent.

Preferably, the porous microspheric particles are a spherical porous silica powder or a spherical porous carbon powder.

Figure 2:
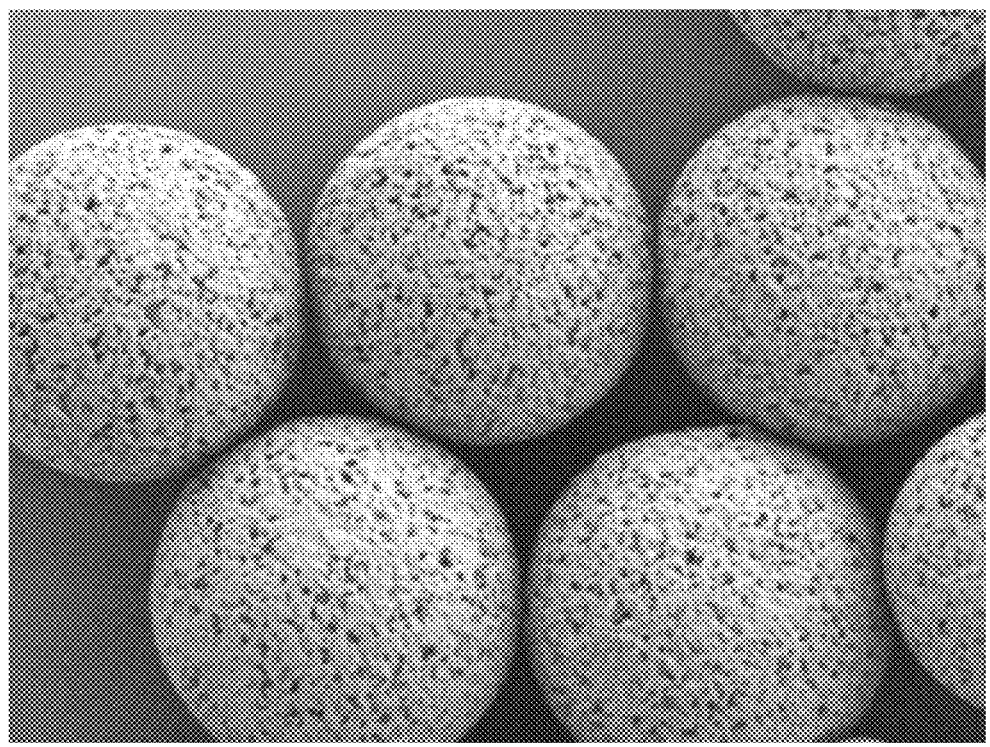
FIG. 2 is a scanning electron micrograph of a spherical porous silica powder in an embodiment of the present disclosure.

FIG. 2 is a scanning electron micrograph of the spherical porous silica powder in an embodiment of the present disclosure. As shown in FIG. 2, a specific material of the porous microspheric particles may be arbitrarily selected, as long as the material has micropores in a surface thereof, has a good adsorbing property, and is preferably non-toxic and harmless to human bodies. A spherical porous silica powder or a spherical porous carbon powder is preferred. The spherical porous silica powder and the spherical porous carbon powder both have good adsorbing properties, dense micropores, and excellent ability in adsorbing a functional agent, and are reasonable in price and suitable for large-scale production of the slow-release silk thread.

The spherical porous silica powder is used as the material of the powder layer. The powder layer formed by the spherical porous silica powder is located between the substrate layer 1 and the protective layer 3 and cannot easily fall out. A functional molecular layer of the functional agent is exposed only on both sides of the silk thread where the cuts are located. This prevents functional molecules of the functional agent in the slow-release layer 2 from volatilizing outward from the substrate layer 1 and the protective layer 3, allowing the functional molecules to volatilize outward only from four sides of the slow-release layer 2 and to be slowly released. Particles of the spherical porous silica powder are filled with nano-scale micropores, and there are also gaps among the particles. The micropores and the gaps can effectively adsorb the functional molecules of the functional agent and decrease a contact area between the functional agent and air, thereby enhancing slow release. The functional molecules inside the slow-release layer 2 can only disperse out by way of migration and diffusion. Among objects having the same volume, the sphere has the smallest surface area, while among objects having the same surface area, the sphere has the largest volume. Therefore, the particles of the spherical porous silica powder have relatively small surface areas, but the micropores therein have relatively large volumes and the gaps among the particles are relatively small. In this case, the micropores and the gaps can accommodate more functional molecules while maintaining a relatively small slow-release area. This helps to slow down the release of the functional molecules, further extend effective duration of the agent for eliminating mites, and ensure a better continuous mite eliminating effect. By prolonging the effective duration of the functional agent according to the present technical solution, the slow-release property of the silk thread is strengthened.

Preferably, the porous microspheric particles each have a particle size of 1-5 microns, and the porous microspheric particles have an average particle size of 3 microns; and the micropores of the porous microspheric particles each have a pore diameter of 2-50 nanometers, and the micropores of the porous microspheric particles have an average pore diameter of 10-15 nanometers.

Cosmetic-grade spherical porous silica powder can be produced by mature processes at low costs, which helps to control the cost of the slow-release silk thread.

Preferably, the functional agent includes a high-activity mite eliminating and bactericidal functional molecules and/or a natural herb extract.

Selection of a specific functional agent is mainly for the purpose of achieving a specific effect. There are many options for the functional agent in the existing technologies, which therefore are not repeated herein in detail. For example, in order to achieve insect and mosquito repelling, mite repelling and killing, soothing and sleep facilitating, and scenting effects, a functional agent containing high-activity mite eliminating and bactericidal functional molecules, a natural herb extract, and a perfume can be selected.

Preferably, the high-activity mite eliminating and bactericidal functional molecules include N-(2-aminoethyl)-2-methylbenzamide, which has very good mite eliminating and bactericidal effects.

Preferably, the natural herb extract is a citronella essence, a lemon eucalyptus essence, and a wormwood essence.

Essences extracted from natural herbs have functional molecules that effectively eliminate mites (repelling and killing mites). Essences extracted from citronella, wormwood, and lemon eucalyptus have natural volatile fragrance and a variety of functional molecules. The essence extracted from citronella has insect and mite repelling effects, as well as antibacterial and bactericidal effects. The essence extracted from wormwood has mosquito repelling, disinfecting, soothing and sleep-facilitating effects. The essence extracted from lemon eucalyptus has mites repelling and killing effects. The herb essence used as the functional agent is harmless to human bodies, has a pleasant smell, and does not affect realization of desired effects.

Preferably, the citronella essence or the lemon eucalyptus essence is 1-2 times by mass of the wormwood essence.

The citronella essence, the lemon eucalyptus essence, and the wormwood essence may be used in a mixed way. Preferably, the citronella essence, the lemon eucalyptus essence, and the wormwood essence are mixed in a mass ratio of 1:1:1. The mixing of the three essences achieves mite eliminating (mite repelling and killing), antibacterial and bactericidal, mosquito repelling, disinfecting, soothing and sleep-facilitating effects.

Preferably, the substrate layer 1 includes polyethylene terephthalate or polyurethane. The protective layer 3 includes polyurethane or polyethylene.

Polyethylene terephthalate, polyurethane, and polyethylene all have good mechanical properties, folding resistance, oil and fat resistance, low gas and water vapor permeability, and excellent gas, water, oil and odor resistance, and are glossy, non-toxic, tasteless, clean, safe, cheap, capable of being produced by mature processes and suitable for large-scale production.

Preferably, the substrate layer 1 has a thickness of 10-16 microns. The protective layer 3 has a thickness of 5-15 microns. The slow-release layer 2 has a thickness of 5-15 microns.

Such thicknesses can meet requirements for mechanical properties of the slow-release silk thread, facilitate convenient preparation and cutting of the silk thread, and are suitable for large-scale production and thus helps to reduce costs.

In addition, the present disclosure also discloses a method for preparing a mite eliminating material. The method includes the following steps.

In step S101, a functional coating material is applied by a coating technique to a polymer film to form a slow-release layer. The functional coating material includes a functional agent, porous microspheric particles, and an organic solvent.

A substrate used is the polymer film, which has a thickness of 10-16 microns. Preferably, the polymer film is a polyethylene terephthalate (PET) film or a polyurethane (PU) film.

Porous microspheric particles containing a functional agent are used to prepare a 10-20% anhydrous ethanol coating material, which can be easily applied to a substrate layer 1 by a coating technique to ensure uniformity of a formed layer after the coating material is cured.

The functional coating material is first applied uniformly by a coating technique to the substrate layer 1 which is a polyethylene terephthalate (PET) film or a polyurethane (PU) film, with a coating being controlled to have a thickness of 3-10 microns, at a drying temperature of 60-100° C., and at a speed of 10-80 m/min.

In step S102, a polymer material is applied by a coating technique or a laminating technique to the slow-release layer 5 to form a protective layer.

A polymer material is applied by a coating technique to the slow-release layer 2 to form a protective layer 3 which is, for example, polyurethane (PU), polyethylene (PE), etc., with a coating being controlled to have a thickness of 5-15 microns, at a drying temperature of 60-120° C., and at a speed of 10 to 80 m/min.

A material such as polyethylene or polypropylene is sprayed on a surface of the slow-release layer by using a laminating machine to form a layer of polyethylene or polypropylene. The layer of polyethylene or polypropylene has thickness that can be designed as required and that is usually 0.01-0.07 mm. The laminating process is simple and mature, and can realize fast production.

In step S103, a cutting procedure is performed along a direction from the protective layer to the polymer film to obtain silk threads.

The above-mentioned functional film is cut in a special silk thread cutting device into thin functional silk threads each having a thickness of 28-40 microns, a width of 100-150 microns, and a length of about 24,000 to 40,000 meters.

The substrate is a polymer film having a thickness of 12-16 microns. Preferably, the substrate is a PET or PU film.

The functional coating material is prepared by mixing 400 parts by weight of an organic solvent with 50-85 parts by weight of a spherical porous silica powder, 5-40 parts by weight of a cosmetic-grade high-activity mite eliminating and bactericidal agent, and 1-10 parts by weight of a cosmetic-grade natural herb extract. The organic solvent is absolute ethanol or ethyl acetate. The high-activity mite eliminating and bactericidal agent includes functional molecules which are N-(2-aminoethyl)-2-methylbenzamide at a concentration of more than 95% (weight ratio). N-(2-aminoethyl)-2-methylbenzamide is internationally recognized as a new, high-efficiency, long-lasting, broad-spectrum, low-toxic, non-irritating, cosmetic-type mite repelling functional molecules.

The spherical porous silica powder is cosmetic grade. As shown in FIG. 1, the spherical porous silica powder is micron-sized particles containing nano-scale micropores. The particles each have a particle size of 1-5 microns, and the particles have an average particle size of 3 microns. The micropores contained in the particles have a pore size distribution of 2-50 nanometers and an average pore size of 10-15 nanometers.

The natural herb extract includes an extract from any of three natural herbs which are citronella, wormwood, and lemon eucalyptus. The citronella extract is an extract from the natural herb citronella, and has insect repelling, antibacterial and bactericidal effects. The wormwood extract is an extract from the natural herb wormwood, and has mosquito and mite repelling, disinfecting, soothing and sleep-facilitating effects. The lemon eucalyptus extract is from the natural herb lemon eucalyptus, and has mite repelling and killing effects. When the natural herb extract includes two or more extracts, a proportion of these different extracts can be adjusted to achieve effects having different emphases. These extracts are now mostly used in cosmetics, insect and mosquito repelling products, and agent bags for repelling and killing mites. The high-activity mite eliminating and bactericidal functional molecules and the natural herb extract are adsorbed in the nano-scale micropores of the spherical porous silica powder.

A method for preparing a long-lasting mite repelling and killing silk thread includes the following steps.

In step (1), a functional coating material is uniformly applied by a coating technique to a substrate to form a porous powder coating having a micron-scale thickness. High-activity mite eliminating and bactericidal functional molecules and a natural herb extract are adsorbed in porous silica powder included in the porous powder coating.

In step (2), a polymer material is laminated or applied to the porous powder coating to form a polymer film-like protective layer 3.

In step (3), the substrate having the porous powder coating and the protective layer 3 is cut into thin silk threads.

"Laminate" in step (2) means to cover the porous powder coating with the polymer material using a laminating technique to form the polymer film-like protective layer 3. The polymer material is preferably PE, or other polymer materials.

The polymer material applied in step (2) is preferably a PU coating material, which is prepared by thoroughly mixing PU and an organic solvent. The organic solvent may be absolute ethanol or ethyl acetate.

Referring to FIG. 2, a long-lasting mite repelling and killing silk thread product prepared by the method of present disclosure includes a substrate layer 11, a porous powder coating 2, and a protective layer 33. The substrate layer 11 is a polymer film, preferably a PET film or a PU film. Preferably, the substrate layer 11 has a thickness of 12-16 microns. The porous powder coating 2 is sandwiched between the substrate layer 11 and the protective layer 33, and is formed by uniformly applying a functional coating material to a substrate by a coating technique. Preferably, the porous powder coating 2 has a micron-scale thickness. The porous powder coating 2 includes a large amount of spherical porous silica powder which has adsorbed high-activity mite eliminating and bactericidal functional molecules and a natural herb extract. The high-activity mite eliminating and bactericidal functional molecules are N-(2-aminoethyl)-2-methylbenzamide. The natural herb extract includes an extract from any of three natural herbs which are citronella, wormwood, and lemon eucalyptus. The protective layer 33 is a polymer film-like protective layer 3 formed by applying a polymer material by a coating technique to the porous powder coating. The applied polymer material is preferably a PU coating material, and the protective layer 3 formed is a PU film. The protective layer 33 may also be a polymer film-like protective layer formed by applying a polymer material by a laminating technique to the porous powder coating. The polymer material used for the laminating is preferably PE, and the protective layer 3 formed is a PE film.

The porous powder coating of the silk thread product is sandwiched between the substrate layer 1 and the polymer protective layer 3, and is exposed only at two sides of the silk thread where cuts of the silk thread are located. The high-activity mite eliminating and bactericidal functional molecules and the natural herb extract disperse out and exert a mite repelling and killing effect, while functional molecules that are not exposed can only disperse out bit by bit by way of molecular diffusion and migration, realizing a long-lasting mite repelling and killing effect of the functional silk thread and enabling the product to have a good long-lasting mite repelling and killing effect. The silk thread product can be used as textile fibers, and the amount and density thereof in a textile material can be adjusted according to requirements of products for the mite repelling and killing effect. This kind of functional silk thread product can be widely used in various sofas, mattresses, carpets, and beddings such as sheets and pillow cases, as well as other textile products. The silk thread may be used in a textile fabric layer of a Simmons mattress to make the mattress have a long-lasting mite repelling and killing effect, used in a base fabric of a carpet to prevent growth and survival of mites in the carpet, and used in a series of beddings to enable the product has a long-lasting mite repelling and killing effect.

Example 1

A polyethylene terephthalate (PET) film was used as a substrate. The PET film had a thickness of 12 microns and a width of 1380 mm.

Spherical porous silica powder had an average particle size of 3 microns. Nano-sized micropores had an average pore diameter of 10-15 nanometers.

Steps of a preparation process were as follows.

In step S201, the PET substrate was placed in a coating machine having a drying tunnel divided into 5 stages, with the 5 stages being controlled to have temperatures of 60° C., 70° C., 80° C., 90° C., and 100° C., respectively. 85 parts of the spherical porous silica powder, 15 parts of a natural herb essence (with a ratio of a citronella essence to a wormwood essence to a lemon eucalyptus essence being 1:1:1), and 400 parts of absolute ethanol were thoroughly mixed, and then applied to the PET substrate by using a 120-mesh netting roller, at a coating speed of 10-80 m/min and with a coating thickness being controlled to be within 6-8 microns.

In step S202, the PET film that had been coated with the spherical porous nano-scale powder layer containing the essence was placed again in a coating machine having a drying tunnel divided into 5 stages, with the 5 stages being controlled to have temperatures of 60° C., 80° C., 100° C., 110° C., and 120° C., respectively. 200 parts of polyurethane (PU) and 800 parts of absolute ethanol were thoroughly mixed, and then applied to the PET film that had been coated with the spherical porous nano-scale powder layer containing the essence by using a 100-mesh netting roller, at a coating speed of 20-80 m/min, and with a coating thickness being controlled to be within 10-12 microns.

In step S203, a functional film obtained from the foregoing application step was cut in a special silk thread cutting device into thin functional silk threads each having a thickness of 28-32 microns, a width of 100 microns, and a length of about 24,000 meters. Each single silk thread was then collected in a small coil.

In step S204, measurement, packaging, and sealing were performed.

Experiments have shown that a bedding textile fabric made of the mite repelling and killing functional silk threads prepared by the above method, when containing 10% (by weight) of the functional silk threads, can realize a mite repelling rate of up to 98% and a mite killing rate of up to 85%, as indicated by professional mite repelling and killing tests.

Example 2

A polyethylene terephthalate (PET) film was used as a substrate. The PET film had a thickness of 15 microns and a width of 1520 mm.

Spherical porous silica powder had an average particle size of 3 microns. Micropores had an average pore diameter of 10-15 nanometers.

Steps of a preparation process were as follows.

In step S301, the PET substrate was placed in a coating machine having a drying tunnel divided into 5 stages, with the 5 stages being controlled to have temperatures of 60° C., 70° C., 80° C., 90° C., and 100° C., respectively. 85 parts of the spherical porous nanometer powder, 15 parts of a natural herb essence (with a ratio of a citronella essence to a wormwood essence to a lemon eucalyptus essence being 1:1:1), and 400 parts of absolute ethanol were thoroughly mixed, and then applied to the PET substrate by using a 120-mesh netting roller, at a coating speed of 20-80 m/min, and with a coating thickness being controlled to be within 8-10 microns.

In step S302, the PET film that had been coated with the spherical porous silica powder layer containing the essence was placed again in a coating machine having a drying tunnel divided into 5 stages, with the 5 stages being controlled to have temperatures of 60° C., 80° C., 100° C., 110° C., and 120° C., respectively. 200 parts of polyurethane (PU) powder and 800 parts of absolute ethanol were mixed thoroughly, and then applied to the PET film that had been coated with the spherical porous silica powder layer containing the essence by using a 100-mesh netting roller, at a coating speed of 20-80 m/min, and with a coating thickness being controlled to be within 12-15 microns.

In step S303, a functional film obtained from the foregoing application step was cut in a special silk thread cutting device into thin functional silk threads each having a thickness of 35-40 microns, a width of 150 microns, and a length of about 40,000 meters. Each single silk thread was then collected in a small coil.

In step S304, measurement, packaging, and sealing were performed.

Experiments have shown that a Simmons mattress fabric made of the mite repelling and killing functional silk threads prepared by the above method, when containing 10% (by weight) of the functional silk threads, can realize a mite repelling rate of up to 99%, and a mite repelling rate of up to 91% after having been washed for 10 times, as indicated by professional mite repelling and killing tests.

Those skilled in the art will easily think of other embodiments of the present disclosure after considering the description and practicing the invention herein disclosed. This application is intended to cover any variations, uses, or adaptive changes of the present disclosure. These variations, uses or adaptive changes follow general principles of the present disclosure and include common knowledge or conventional technical means in the art that are not herein disclosed. The description and the embodiments are to be regarded as exemplary only, and the true scope and spirit of the present disclosure are defined in the accompanying claims.

It should be appreciated that the present disclosure is not limited to the precise structures as described above and shown in the drawings, and various modifications and changes can be made without departing from the scope of the present disclosure.

The invention claimed is:

1. A slow-release silk thread, comprising: a substrate layer, a slow-release layer, and a protective layer, wherein
   the slow-release layer is provided between the substrate layer and the protective layer; and
   the slow-release layer comprises porous microspheric particles in which a functional agent is adsorbed, wherein the porous microspheric particles are spherical porous silica powder or spherical porous carbon powder, and the functional agent comprises high-activity mite eliminating and bactericidal functional molecules, and/or a natural herb extract; wherein the substrate layer comprises polyethylene terephthalate or polyurethane; and wherein the protective layer comprises polyurethane or polyethylene, and wherein the thread is effective in repelling and killing mites.

2. The slow-release silk thread according to claim 1, wherein the natural herb extract comprises a citronella essence and/or a lemon eucalyptus essence.

3. The slow-release silk thread according to claim 2, wherein the natural herb extract further comprises a wormwood essence.

4. The slow-release silk thread according to claim 3, wherein the citronella essence or the lemon eucalyptus essence is 1-2 times by mass of the wormwood essence.

5. The slow-release silk thread according to claim 1, wherein the slow-release layer has a thickness of 5-15 microns.

6. The slow-release silk thread according to claim 1, wherein the porous microspheric particles each have a particle size of 1-5 microns, and the porous microspheric particles have an average particle size of 3 microns; and micropores of the porous microspheric particles each have a pore diameter of 2-50 nanometers, and the micropores of the porous microspheric particles have an average pore diameter of 10-15 nanometers.

7. The slow-release silk thread according to claim 1, wherein the substrate layer has a thickness of 10-16 microns.

8. The slow-release silk thread according to claim 1, wherein the protective layer has a thickness of 5-15 microns.

* * * * *